[15] 3,691,119
[45] Sept. 12, 1972

United States Patent
Tanquary

[54] OXYSILYLENE FLUOROCHEMICAL POLYMERS AND PROCESS FOR PREPARING SAME

[72] Inventor: Albert Charles Tanquary, Birmingham, Ala.

[73] Assignee: Southern Research Institute, Birmingham, Ala.

[22] Filed: Aug. 18, 1970

[21] Appl. No.: 64,811

[52] U.S. Cl............260/2 S, 117/161 ZA, 260/37 SB, 260/46.5 G, 260/46.5 P, 260/47 R, 260/448.2 D, 260/448.8 R
[51] Int. Cl................................................C08f 11/04
[58] Field of Search ..260/2 S, 46.5 P, 47 R, 448.8 R, 260/46.5 G

[56] References Cited

UNITED STATES PATENTS

| | | | |
|---|---|---|---|
| 3,346,515 | 10/1967 | Curry | 260/2 |
| 3,366,593 | 1/1968 | Breed | 260/33.6 |
| 3,376,233 | 4/1968 | Gall | 260/2 |

Primary Examiner—Donald E. Czaja
Assistant Examiner—M. I. Marquis
Attorney—Burns, Doane, Swecker & Mathis

[57] ABSTRACT

An oxysilylene fluorochemical polymer is prepared by reacting (a) at least one fluorochemical diol containing two pairs of trifluoromethyl groups, each pair being attached directly to a carbon atom having a hydroxy group attached thereto, and (b) at least one silylamino compound having two amino groups each attached directly to a silicon atom; or, reacting a dialkali metal salt of the diol with a corresponding dichloride of the silylamino compound. The preferred fluorochemical diols include the isobutylene and propylene adducts of hexafluoroacetone, and the preferred silylamino compounds include 1,4-bis(dimethylaminodimethylsilyl)benzene and bis(dimethylamino) dimethylsilane.

12 Claims, No Drawings

3,691,119

OXYSILYLENE FLUOROCHEMICAL POLYMERS AND PROCESS FOR PREPARING SAME

BACKGROUND OF THE INVENTION

1. Field of the Invention

The present invention relates to oxysilylene fluorochemical polymers and to processes for making them.

2. Summary of the Prior Art

Since their discovery, synthetic resins or polymers such as the silicon-containing and fluorine-containing polymers have found wide application in industries and scientific disciplines in many forms such as coatings, shaped articles and binders. See, for example, U.S. Pat. Nos. 2,800,494, 3,346,515, and 3,493,546. However, the search has continued, particularly in the aerospace industries, for new polymers having improved resistance to existing and anticipated destructive elements and forces to be encountered in their environments. For example, new polymers are needed to meet the requirements for thermally stable rain-erosion-resistant coatings for radomes and leading edges of high-speed aircraft. In addition to being thermally stable and rain-erosion-resistant, these coatings must be flexible, radar transparent, and must resist degradation upon exposure to fuels, lubricants, organic solvents, ultraviolet radiation, and extreme weather conditions. Relative ease of fabrication is yet another highly desirable feature of these coatings.

Certain silicon-containing polymers are heat and solvent resistant and may be cured at moderate conditions, but they generally have poor rain-erosion-resistance. Certain fluorocarbon polymers are also heat and solvent resistant, but they do not cure at moderate conditions.

SUMMARY OF THE INVENTION

Accordingly, an object of the present invention is to provide novel polymers having desired characteristics as discussed above.

Another object of the present invention is to provide novel polymers containing both silicon and fluorine atoms to combine the advantages of known silicon-containing and fluorine-containing polymers without incurring or substantially alleviating their disadvantages.

Another object of the present invention is to provide novel thermally stable oxysilylene fluorochemical polymers having improved rain-erosion-resistance and which may be cured at moderate conditions.

Yet another object of the present invention is to provide processes for preparing these polymers.

These and other objects of the present invention will be apparent from the following:

In accordance with the present invention, oxysilylene fluorochemical polymers are provided which have recurring units represented or exemplified by the structural formula:

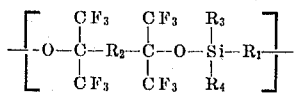

in the above formula, $R_1$ represents a covalent bond or divalent radical such as a radical represented by the structural formula

$R_2$ and $R_5$ represent divalent radicals such as alkylene, alkenylene, cycloalkylene, cycloalkenylene, arylene, arylalkylene, alkylarylene, oxyalkylene, or iminoalkylene. Further, $R_3$, $R_4$, $R_6$, and $R_7$ represent monovalent radicals such as methyl, ethyl, or phenyl.

The process for making the above-defined oxysilylene fluorochemical polymers comprises reacting one or more fluorochemical diols containing two pairs of trifluoromethyl groups, each pair being attached directly to a carbon atom having a hydroxy group attached thereto, and one or more silylamino compounds having two amino groups each attached directly to a silicon atom. Alternatively, a dialkali metal salt of the diol may be reacted with a dichloride corresponding to the silylamino compound to yield the oxysilylene fluorochemical polymers of the present invention.

The essence of the present invention is the discovery that these diols or their corresponding dialkali metal salts can be reacted with the silylamino compounds or their corresponding dichlorides to give stable polymers. In contrast to the present invention, certain fluorocarbon diols such as hexafluoropentane diol and tetrafluorohydroquinone when reacted with silylamino compounds such as bis(dimethylamino)dimethyl-silane yield a polymer which rapidly hydrolyzes, i.e., decomposes, upon exposure to the atmosphere.

Other aspects and advantages of the present invention will be apparent from the following description of the preferred embodiments:

DESCRIPTION OF THE PREFERRED EMBODIMENTS

Any fluorochemical diol containing two pairs of trifluoro-methyl groups, each pair being attached directly to a carbon atom having a hydroxy group attached thereto, may be used in the present invention to prepare the desired oxysilylene fluorochemical polymers.

The fluorochemical diols may be represented by the general structural formula:

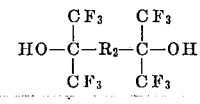

where $R_2$ is a divalent organic radical which may be an alkylene, alkenylene, cycloalkylene, cycloalkenylene, arylene, arylalkylene, arylalkenylene, alkenylarylene, oxyalkenylene, oxyarylene, oxyalkyarylene alkylarylene, oxyalkylene, iminoalkylene, and iminoarylene. The alkyl, alkylene and alkenylene groups are portions of the groups preferably contain from two to six carbon atoms.

The corresponding dialkali metal salts of these diols may also be reacted with the below described silyl dichlorides to yield polymers of the present invention. The term "corresponding dialkali metal salts" is used herein to define these compounds having the general structural formula set forth above except that each hydroxy group (OH) is replaced by an alkali metal alkoxide group (e.g., ONa). For example, the sodium, potassium and lithium salts of the diols may be used. Mixed alkali metal salts, e.g., the half sodium-half potassium salt, are also contemplated in the present invention.

The most preferred fluorochemical diols are the isobutylene and propylene adducts of hexafluoroacetone (HFA) which adducts may be represented by the general formulas:

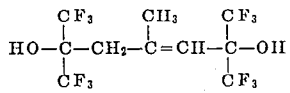

HFA—isobutylene adduct (I)

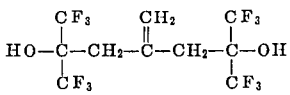

HFA—isobutylene adduct (II)

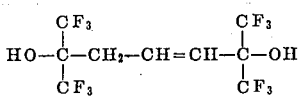

HFA—propylene adduct

These isobutylene and propylene adducts of hexafluoroacetone are most preferred because they have been found to give flexible and the most stable polymers when reacted with the below described silylamino compounds.

Non-limiting examples of other specific fluorochemical diols which may be used in the present invention include

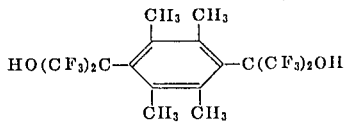

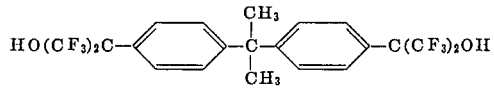

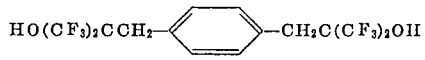

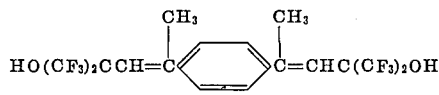

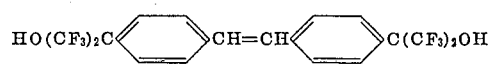

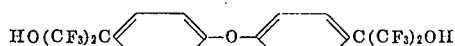

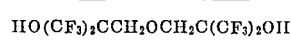

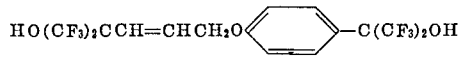

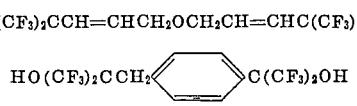

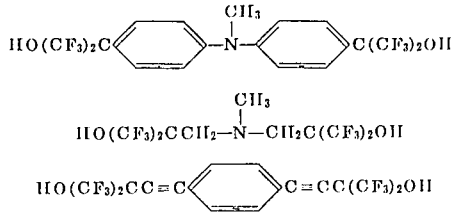

and their corresponding dialkali metal salts.

The manner in which the fluorochemical diol is prepared is well known and does not form a part of the present invention. See, for example, U.S. Pat No. 3,324,187 and *J. Org. Chem.*, 33, 2302–2310 (1968).

Any silylamino compound having two amino groups each attached directly to a silicon atom may be reacted with the fluorochemical diols heretofore described to prepare the desired oxysilylene fluorochemical polymers.

The silylamino compounds may be represented by the general structural formulas:

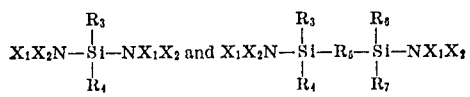

where $R_3$, $R_4$, $R_6$ and $R_7$ represent monovalent radicals which may be methyl, ethyl, or phenyl; wherein $R_5$ represents a divalent radical which may be alkylene, alkenylene, cycloalkylene, cycloalkenylene, arylene, arylalkylene, arylalkenylene, alkenylarylene, oxyalkenylene, oxyarylene, oxyalkyarylene, alkylarylene, oxyalkylene, iminoalkylene, and iminoarylene; and wherein $X_1$ and $X_2$ represent hydrogen, an aryl group, or an alkyl group. Preferably, $R_5$ is arylene, and $X_1$ and $X_2$ are alkyl groups having from one to two carbon atoms, preferably methyl.

The corresponding silyl dichlorides of these silylamino compounds may be concurrently used with the silylamino compounds to react with the diols, and may also be used above to react with the heretofore described dialkali metal salts of the fluorochemical diols to yield the polymers of the present invention. The terms "corresponding silyl dichloride" and "corresponding dichloride" are used herein to define those silyl compounds having the structural formula set forth above except that each amino group ($X_1X_2N$) is replaced by a chloro (Cl) group.

The most preferred silylamino compounds are 1,4-bis(dimethyl-aminodimethylsilyl)benzene and bis(dimethylamino)dimethylsilane which have been found to give the most stable polymers when reacted with the above-described fluorochemical diols.

Non-limiting examples of other specific silylamino compounds which may be used in the present invention include

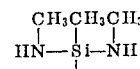

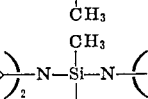

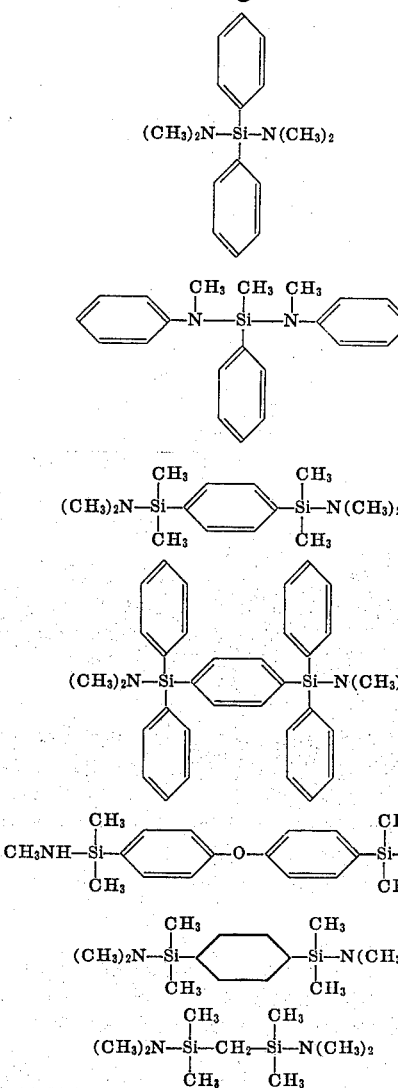

and their corresponding dichlorides.

The manner in which the silylamino compound is prepared is well known and does not form a part of the present invention. See, for example, the preparation of bis(dimethylamino)dimethylsilane described by H.H. Anderson, *J. Am. Chem. Soc.*, 75, pp. 995–997 (1953).

The above-described fluorochemical diols and silylamino compounds may be further substituted with small non-reactive substituents such as methyl or ethyl groups, or other small substituents which are not capable of reaction under the conditions of reaction or polymerization of the fluorochemical diol with the silylamino compound.

Typically, the oxysilylene fluorochemical polymers of the present invention may be formed by reacting one or more of the above-described fluorochemical diols and one or more of the above-described silylamino compounds in reactant mole ratios of about 0.8:1 to 1.2:1, preferably about 0.9:1 to 1.1:1, and most preferably equimolar, i.e., about 1.0:1; for example, by reacting HFA-isobutylene adduct (I) and 1,4-bis(dimethylaminodimethylsilyl)benzene in an equimolar reactant mole ratio of 1.0:1 as exemplified by the following reaction:

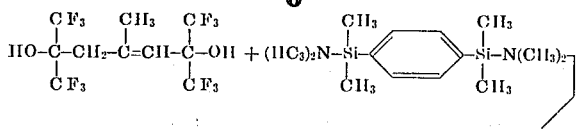

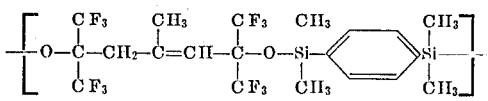

The oxysilylene fluorochemical polymers of the present invention may be made by a number of different specific processes or routes.

For example, the polymers may be made by a one stage or two stage procedure, preferably using organic solvent as the reaction or polymerization medium for the reactants. Alternatively, the one or two stage polymerization may be conducted in the absence of any solvent.

Suitable solvents include normally liquid organic solvents such as the lower aliphatic ethers, e.g., diethyl ether, 1,4-dioxane, and tetrahydrofuran; the lower fluorinated aliphatic ethers, e.g., $(n-C_4F_9)_2O$, FREON E2$^{TM}$ (E.I. duPont de Nemours & Co.); the aromatic hydrocarbons, e.g., benzene, toluene, and xylene; and the chlorinated methanes and ethanes, e.g., carbon tetrachloride, 1,1,1-trichloroethane, and 1,1,2-trichloroethane. The term "normally liquid" is used herein to indicate a liquid state at 25° C and 760 mm Hg pressure.

Tetrahydrofuran and perfluorinated (n-dibutyl)ether are the most preferred solvents.

The one stage procedure can be carried out by dissolving and heating the reactants in a solvent polymerization medium at temperatures of about 25° to 160° C, and more preferably at about 60° to 140° C for sufficient time to produce the desired molecular weight polymer, or until no further reaction is detected. Generally, such reaction periods range from about 1 to 24 hours, and more usually 4 to 16 hours, depending on the particular reactants used, temperatures employed, and other particular process parameters. The resulting polymer may be isolated from the reaction medium by evaporating the solvent or precipitating the polymer by the addition of a non-solvent such as methanol. When the alkali metal salt of the diol is used with the silyl dichloride, the sodium chloride by-product may be removed by filtration before the polymer is isolated.

The reaction is usually conducted in the presence of an inert atmosphere of nitrogen, argon or the like, and under substantially moisture-free conditions, i.e., in an atmosphere containing no or little water, e.g., less than about 100 ppm water vapor.

Whenever a solvent polymerization medium is used, from about 0.5 to 10 parts, and preferably from about 1 to 3 parts, of the solvent polymerization medium is provided per part of the reactants.

Whenever the polymerization is conducted in the absence of solvent, the same ranges of temperatures and reaction times, and the same kinds of inert atmosphere may be used as described above.

To maximize yield and minimize production of cyclic products when using the one state procedure, the fluorochemical diol may be present initially in a stoichiometrically excess amount with respect to the silylamino compound, which is thereafter incrementally added to the reaction medium until at least substantially equal molar amounts of diol and silylamino reactants have been added. For example, the diol may be present initially as the sole reactant in the reaction zone, and the silylamino compound may be added in increments of about 10 to 20 percent over a period of about 0.5 to 24 hours; or the diol may be present initially in a 10 to 20 percent excess, and the silylamino added in increments of 1 to 2 percent over the same time period.

In the two stage reaction procedure, the fluorochemical diol and the silylamino compound such as bis(dimethylamino)dimethylsilane may first be reacted to obtain a silylated adduct represented by the structural formula

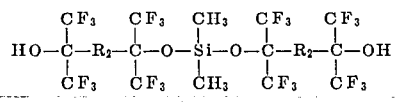

The silylated adduct is then reacted with additional silylamino compound to yield a polymer of the present invention. This two stage procedure is preferably used whenever the predominant reaction product of a particular fluorochemical diol and a particular silylamino compound is a cyclic or non-polymeric product. This two stage procedure may be most advantageous whenever the silylamino compound to be reacted is bis(dimethylamino) dimethylsilane.

As stated above, the two stage procedure can be carried out in a solvent reaction medium or in the absence of solvent. For example, the two stage procedure can be carried out by dissolving and heating the reactants in a solvent polymerization medium at temperatures of about 25° to 160° C, and more preferably at about 60° to 140° C for a sufficient time to produce the corresponding silylated adduct. Generally, such reaction periods range from about 1 to 50 hours, and more usually 4 to 6 hours. The resulting silylated adduct may be isolated by distillation or precipitation with methanol.

The silylated adduct is then reacted with additional silylamino compound by introduction into a second stage polymerization zone and heating at temperatures of about 25° to 160° C, preferably 60° to 140° C, under substantially moisture-free conditions, as described above, to yield an oxysilylene fluorochemical polymer. Generally, the second stage reaction periods range from about 1 to 24 hours, and more typically to 4 to 16 hours.

The above one and two stage polymerization processes may be conducted at atmospheric, superatmospheric, or subatmospheric pressures in a batch, semi-continuous, or continuous manner.

The molecular weight of the oxysilylene fluorochemical polymers produced herein may be indicated by an inherent viscosity (I.V.) of at least about 0.05, e.g., about 0.1 to 1.0.

The inherent viscosity, (I.V.), as used in the present specification and claims, is measured at 30° C at a concentration of 1.0 gram of polymer per deciliter of tetrahydrofuran solvent. The viscosity of the polymer solution is measured relative to that of the solvent and the inherent viscosity is determined from the following equation:

$$I.V. = \frac{\ln\left(\frac{V_2}{V_1}\right)}{C}$$

In the above formula, $V_2$ is the efflux time of the solution, $V_1$ is the efflux time of the solvent, and $C$ is the concentration expressed in grams of polymer per deciliter of solution. As is known in the polymer art, inherent viscosity provides a measure of the molecular weight of the polymer, with higher inherent viscosities indicating higher molecular weight and vice versa.

Depending upon the reactants used and the molecular weights of the products, the polymers may range from oily liquids or soft waxes to strong elastomers or hard plastics. The polymers may be useful as dielectric fluids, heat exchange oils, lubricants, coatings, adhesives, binders, sealants, gaskets, encapsulating resins, films, fibers, tubing, and molded articles.

It will also be apparent that other modifying agents such as fillers, e.g., carbon black, silica, glass fibers, etc., as well as heat and light stabilizers, dyes, and pigments may be incorporated into the polymers without departing from the scope of the invention.

The invention is additionally illustrated by the following examples; all parts and percentages are by weight in the examples, as well as in other parts of the specification and claims, unless otherwise indicated.

EXAMPLE I

Run 1

This run illustrates the preparation and properties of An Oxysilylene Fluorochemical Polymer Of The Present Invention and obtained from the reaction of hexafluoroacetone-isobutylene adduct (I) and 1,4-bis(dimethylaminodimethylsilyl)benzene. The oxysilylene fluorochemical polymer was prepared by placing 3.00 parts of the adduct and 5 parts of reagent grade xylene in a stirred reactor through which nitrogen flux at substantially atmospheric pressure was passing. To this reactor, 1.77 parts of 1,4-bis(dimethylaminodimethylsilyl) benzene were added. The resultant reaction mixture was heated to about 155° C, with the xylene being refluxed for 1 hour at that temperature while an initial gas evolution took place. At that point, 0.018 parts of the silylamino compound were added every 20 minutes until the total amount of 1,4-bis(dimethylaminodimethylsilyl)benzene amounted to 2.18 parts. The solution was then refluxed for 16 hours. The inherent viscosity of the polymer was found at that point to be 0.05. The addition of silylamino compound was resumed until an additional 0.21 parts had been added, and the mixture was refluxed at 140° C for 16 hours. The resultant inherent viscosity of the polymer was 0.129. The reaction was then terminated by adding 2 parts of water and continuing to flux for 2 hours. After cooling, excess water and a trace of brown insoluble material were removed by centrifugation. The inherent viscosity of the polymer was measured and found to be 0.13. The elemental analysis of the polymer substantially agreed with the theoretical calculation for $C_{20}H_{22}F_{12}O_2Si_2$, a polymer having recurring units of the formula

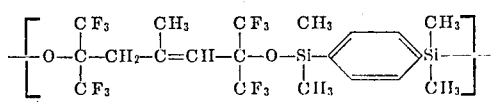

Using standard gel permeation chromatography techniques, the number average molecular weight was calculated to be about 11,000, and the weight average molecular weight was calculated to be about 30,000.

Run 2

This run illustrates the preparation and properties of A Polymer Not Of The Present Invention and prepared from a fluorinated linear alkylene glycol (1,5-dihydroxy-2,2,3,3,4,4,-hexafluoropentane diol) and bis(dimethylamino)dimethylsilane. The polymerization procedure was the same as in Run 1 except that dioxane was used as the solvent, and the silylamine was added to the refluxing dioxane solution at a rate of 0.05 milliliters per 5 minute period over a total period of 2 hours, with refluxing being continued thereafter for 3.5 hours after the calculated stoichiometric amount of dimethylsilane had been added. The resulting polymer had an inherent viscosity of 0.29. This polymer was a viscous oil but its viscosity decreased visibly upon exposure to ambient atmospheric air (25° C and 760 millimeters mercury). After the oil was exposed to the air for several days, crystals of the original diol formed in the oil. The polymer was judged to be too sensitive to moist air to be useful.

Run 3

The run illustrates the preparation of A Polymer Not Of The Present Invention and prepared from a fluorinated aromatic diol (tetrafluorohydroquinone) and bis(dimethylamino)dimethylsilane. The polymer was prepared from these reactants in accordance with the procedure used in Run 2. After removal of the solvent, the resulting polymer was obtained as a dark brown sticky grease which changed rapidly to a friable mass upon exposure to ambient air. This polymer was also judged to be too sensitive to moisture in the air to be useful.

Run 4

Thus run illustrates the preparation of A Polymer Not Of The Present Invention and prepared from a fluorinated aromatic diol (tetrafluorohydroquinone) and 1,4-bis(dimethylaminodimethylsilyl)-benzene. The same procedure described in Run 2 for the polymerization of tetrafluorohydroquinone and bis(dimethylamino)dimethylsilane was tried. The polymeric product changed rapidly to a dark brown, friable mass upon exposure to ambient air. Again, this polymer was judged too sensitive to moisture in the air to be useful.

EXAMPLE II

The polymers of the present invention may be cured into elastomers using a wide variety of well known curing agents. For example, the polymers of the present invention may be cured according to U.S. Pat. No. 2,843,555 which is incorporated herein by reference. To illustrate, an oxysilylene fluorochemical polymer having an inherent viscosity of 0.14 was prepared in accordance with Run 1 of Example I except that the polymer, dissolved in xylene, was precipitated by the addition of methanol.

Five parts of this polymer were mixed with 30 parts of xylene and 0.78 parts of partially hydrolyzed ethyl silicate ("Ethyl Silicate 40" from Union Carbide Corporation). The resulting solution was then mixed with 0.20 parts of dibutyltin diacetate. The resulting mixture was stirred thoroughly and poured into a flat bottom aluminum container. The cast film gelled in about 2 hours and reached maximum strength in 5 days. Forty-three days after being cast, the nominal tensile strength of the film was 1,240 psi and its elongation at break was 265 percent giving an ultimate tensile strength of 3,300 psi. The film was rubbery at room temperature (25° C) but it became stiff at about 0° C.

To determine its solvent resistance, a small piece of cured polymer measuring 0.15 inches by 0.20 inches was placed on a glass cover slide over a scale with divisions of 0.01 inches. The initial overall length of the cured polymer was measured under a binocular microscope, and a small steel cylinder with open ends was placed on the glass to enclose the sample. Solvent was poured into the cylinder and the sample was observed until the length became constant. The ratio of the swollen to the unswollen length is reported as the swelling ratio. The results are summarized in Table 1 with similar data on the swelling of a chloroprene elastomer (neoprene N-83) and a silicone elastomer (silicone K1213, peroxide cured).

TABLE 1

| Elastomer | Solvent | Swelling Ratio (at 25°C) |
|---|---|---|
| Cured Polymer of Example II | Toluene | 1.41 |
| Cured Polymer of Example II | Jet Fuel (JP-4) | 1.26 |
| Silicone K1213 | Toluene | 1.82 |
| Silicone K1213 | Jet Fuel (JP-4) | 1.55 |
| Neoprene N-83 | Toluene | 1.80 |
| Neoprene N-83 | Jet Fuel (JP-4) | 1.02 |

As can be seen from the above table, the polymer of the present invention had good solvent resistance comparable to that of neoprene and silicone elastomers which are frequently employed in applications where solvent resistance is important.

Many polymers containing C-O-Si bond are known to be hydrolytically unstable. However, the oxysilylene fluorochemical polymer of this Example was not degraded by boiling for one hour in 1 percent aqueous hydrochloric acid at 100° C or in 1 percent sodium hydroxide at 100° C. Further, a strip of the cured polymer was stable to boiling water at 100° C over a period of 2 hours.

Thermogravimetric analysis of the polymer showed that only 10 percent of the weight of the polymer had been lost when the temperature reached 400° C at a heating rate of 10° C per minute in nitrogen. This analysis places the polymer among the most stable elastomers known.

EXAMPLE III

Run 1 of Example I was repeated except that the hexafluoroacetone-propylene adduct was used instead of the isobutylene adduct. The inherent viscosity of the resulting polymer was 0.14.

EXAMPLE IV

Run 1

This run illustrates the successful production of an oxysilylene fluorochemical polymer from hexafluoroacetone-propylene adduct and bis(dimethylamino)dimethylsilane by carrying out the reaction in two stages. In the first stage, an intermediate diol was prepared by adding the diaminosilane in small increments of about 0.1 parts per minute to a stirred reactor containing 94 parts of hexafluoroacetone-propylene adduct. After adding about 9.1 parts of the dimethylsilane, a silicon-containing diol was isolated by distillation of the reaction mixture of about 93° C and 0.03 millimeters mercury. In the second stage, nine parts of the resulting diol was reacted with 0.6 parts of additional bis(dimethylamino)dimethylsilane at 140° C for 14 hours. The resulting polymer had an inherent viscosity of 0.08.

Run 2

This comparative run illustrates an attempted one-stage polymerization of hexafluoroacetone-isobutylene adduct with bis(dimethyl-amino)dimethylsilane which resulted in the principal product being a cyclic ether having the formula

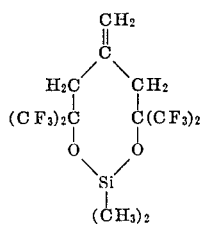

Twenty parts of the diaminosilane as a 35 percent solution in dioxane was added slowly to 50 parts of a refluxing 35 percent dioxane solution of the adduct. Refluxing was at 100° C which was allowed to continue for 2 hours. A small amount of low molecular weight polymer was produced, but the principal product was the cyclic ether. Thus, in this instance a two stage reaction procedure such as described in Run 1 above must be used to prevent formation of the cyclic product.

EXAMPLE V

This Example illustrates the preparation of a useful polymer by the reaction of the disodium salt of hexafluoroacetone-propylene adduct with dimethyldichlorosilane. To a stirred reactor containing 9.83 parts of the disodium salt dissolved in 50 parts of ether was added 3.03 parts of freshly distilled dimethyldichlorosilane. The precipitate formed immediately was filtered off and the clear ether solution was evaporated to yield the polymer in the form of an oil. This oil was heated to 160° C at 0.05 millimeters mercury pressure to distill off cyclic by-products. The inherent viscosity of the resulting product was 0.01.

EXAMPLE VI

This example shows the use of a combination of diaminosilane and dichlorosilane in the reaction with the diol. It is believed that the combination of a diaminosilane and dichlorosilane gives a higher molecular weight polymer by removing the amine as the hydrochloride, which is insoluble in the fluorinated either solvent.

The hexafluoroacetone-propylene adduct, 13.3 parts, was dissolved in 42 parts of "Freon E-2" (a fluorinated ether of E. I. du Pont de Nemours, and Co., Inc.) in a reactor through which nitrogen was flowing slowly at substantially atmospheric pressure. To this reactor, 1.29 parts of bis(dimethylamino)dimethylsilane and 1.14 parts of dimethyl-dichlorosilane were added. The resultant reaction mixture was heated to reflux temperature (104° C). While the solution was refluxing, 0.011 parts of the dichlorosilane and 0.013 parts of the diaminosilane were added alternately and repetitively until the total amount of the dichlorosilane was 1.36 parts and of the diaminosilane was 1.55 parts. The resulting solution of polymer was cooled and separated from the salt layer by decantation. A sample of the polymer was withdrawn and found to have an inherent viscosity of 0.07 dl/g. The polymer end-groups were hydrolyzed by adding 2 parts of water to the solution and refluxing for 1 hour. The solution was allowed to cool, excess water was removed by centrifugation, and the last traces of water were removed by drying the solution over anhydrous sodium sulfate. After adding, successively, an additional 0.10 parts of diaminosilane and 0.13 parts of dichlorosilane to the refluxing solution of polymer that had been hydrolyzed, the polymer was found to have an inherent viscosity of 0.10 dl/g. By repeating the hydrolysis procedure and then adding an additional 0.14 parts diaminosilane and allowing the mixture to reflux overnight, a polymer was obtained that had an inherent viscosity of 0.20 dl/g. Additional dichlorosilane, 0.20 parts, was then added, and the solution was refluxed for 1 hour. Finally, water, 2 parts, was added to hydrolyze the end-groups, the excess water was removed by centrifugation, and the polymer was purified by precipitation as follows: 17 parts of tetrahydrofuran was added to 16 parts of the polymer solution, which contained 4.4 parts polymer. Methanol, 20 parts, was added to the stirred solution and 3.2 parts of polymer with an inherent viscosity of 0.26 dl/g precipitated.

The glass transition temperature of the polymer was −50° C.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention set forth in the following claims.

I claim:

1. An oxysilylene fluorochemical polymer having recurring units represented by the structural formula

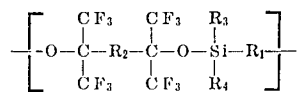

wherein $R_1$ represents a covalent bond or a divalent radical

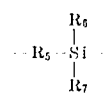

wherein $R_2$ and $R_5$ represents a divalent radical selected from the group consisting of alkylene, alkenylene, cycloalkylene, cycloalkenylene, arylene, arylalkylene, arylalkenylene, alkenylarylene, oxyalkenylene, oxyarylene, oxyalkarylene, alkylarylene, oxyalkylene, iminoalkylene, and iminoarylene; and wherein $R_3$, $R_4$, $R_6$, and $R_7$ represent monovalent radicals selected from the group consisting of methyl, ethyl, and phenyl.

2. The polymer of claim 1 wherein $R_2$ is alkylene or alkenylene of from two to six carbon atoms, wherein $R_5$ is aryl, and wherein $R_3$, $R_4$, $R_6$, and $R_7$ are methyl.

3. The polymer of claim 1 wherein $R_1$ represents a covalent bond and wherein $R_2$ represents alkylene or alkenylene of from two to six carbon atoms, and wherein $R_3$ and $R_4$ are methyl.

4. The polymer of claim 1 wherein $R_1$ represents

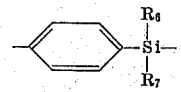

and wherein $R_2$ represents alkylene or alkenylene of from two to six carbon atoms, and wherein $R_3$, $R_4$, $R_6$ and $R_7$ are methyl.

5. An oxysilylene fluorochemical polymer consisting essentially of recurring units represented by the structural formula

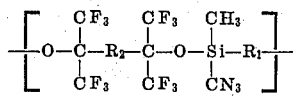

wherein $R_1$ represents a covalent bond or divalent radical

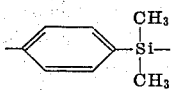

and wherein $R_2$ is a divalent radical selected from the group consisting of

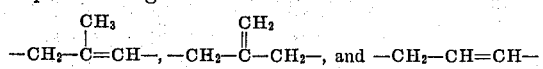

6. A process for making an oxysilylene fluorochemical polymer, which process comprises
reacting by contacting in a solvent reaction medium and under substantially moisture-free conditions,
A. at least one fluorochemical diol represented by the structural formula

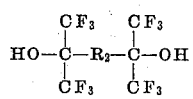

wherein $R_2$ represents a divalent radical selected from the group consisting of alkylene, alkenylene, cycloalkylene, cycloalkenylene, arylene, arylalkylene, arylalkenylene, alkenylarylene, oxyalkenylene, oxyarylene, oxyalkarylene, alkylarylene, oxyalkylene, iminoalkylene, and iminoarylene; and
B. bis(dimethylamino)dimethylsilane to obtain the silylated adduct represented by the structural formula

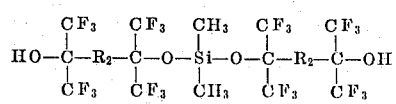

and thereafter reacting the silylated adduct with additional bis(dimethylamino)-dimethylsilane to yield a polymer consisting essentially of recurring units represented by the structural formula

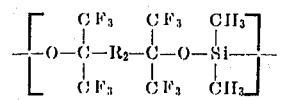

7. A process for making oxysilylene fluorochemical polymers, which process comprises
reacting by contacting in a substantially moisture-free reaction zone at a temperature of about 25° to 160° C and in a reactant (A): reactant (B) mole ratio of about 0.8:1 to 1.2:1
A. at least one fluorochemical diol represented by the structural formula

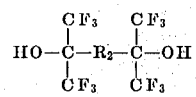

wherein $R_2$ represents a divalent radical selected from the group consisting of alkylene, alkenylene, cycloalkylene, cycloalkenylene, arylene, arylalkylene, arylalkenylene, alkenylarylene, oxyalkenylene, oxyarylene, oxyalkyarylene, alkylarylene, oxyalkylene, iminoalkylene, and iminoarylene, and
B. at least one silylamino compound selected from the class consisting of

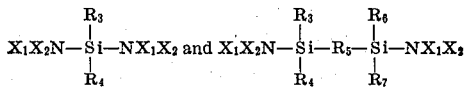

wherein $R_3$, $R_4$, $R_6$, and $R_7$ represent monovalent radicals selected from the group consisting of methyl, ethyl, and phenyl; wherein $R_5$ represents a divalent radical selected from the group consisting of alkylene, alkenylene, cycloalkylene, cycloalkenylene, arylene, arylalkylene, arylalkenylene, alkenylarylene, oxyalkenylene, oxyarylene, oxyalkyarylene, alkylarylene, oxyalkylene, iminoalkylene, and iminoarylene, and wherein $X_1$ and $X_2$ are selected from the group consisting of hydrogen, and alkyl group and an aryl group.

8. The process of claim 7 wherein for each part of reactants about 0.5 to 10 parts of an organic solvent polymerization medium are present in the reaction zone, the medium being selected from the group consisting of the normally liquid lower aliphatic ethers, lower fluorinated aliphatic ethers, aromatic hydrocarbons, and the chlorinated methanes and ethanes.

9. The process of claim 7 wherein the temperature is about 60° to 140° C and the mole ratio is about 0.9:1 to 1.0:1.

10. A process for making oxysilylene fluorochemical polymers having recurring units represented by the structural formula

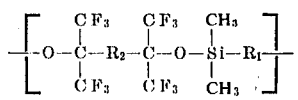

which process comprises
reacting by contacting in a substantially moisture-free organic solvent polymerization medium at a temperature of about 60° to 140° C substantially equimolar amounts of (a) 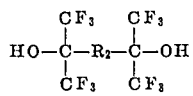

and wherein $R_2$ is a divalent radical selected from the group consisting of

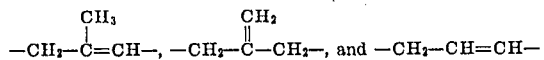

and (b) bis(dimethylamino)dimethylsilane or 1,4-bis(dimethylamino-dimethylsilyl)benzene, until a polymer having an I.V. of at least about 0.05 is produced.

11. The process of claim 9 wherein for each part of reactants about 1 to 3 parts of tetrahydrofuran or perfluorinated di-n-butyl ether polymerization medium are present.

12. The polymer of claim 1 wherein for $R_2$ the alkylene, alkenylene, and alkyl groups or portions of the groups contain up to 12 carbon atoms and the arylene and aryl groups or portions of the groups contain up to 15 carbon atoms; and wherein for $R_5$ the alkylene, alkenylene, and alkyl groups or portions of the groups contain up to six carbon atoms and the arylene and aryl groups or portions of the groups contain up to 12 carbon atoms.

* * * * *